(12) United States Patent
Fahland et al.

(10) Patent No.: US 12,131,150 B2
(45) Date of Patent: Oct. 29, 2024

(54) SYSTEM AND METHODS FOR PATCH MANAGEMENT

(71) Applicant: Ivanti, Inc., South Jordan, UT (US)

(72) Inventors: Michael Fahland, Oakdale, MN (US); Nicholas Krueger, Somerset, WI (US); Sean McDonald, St. Paul, MN (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 16/693,123

(22) Filed: Nov. 22, 2019

(65) Prior Publication Data
US 2020/0142689 A1 May 7, 2020

Related U.S. Application Data

(63) Continuation of application No. 14/504,169, filed on Oct. 1, 2014, now Pat. No. 10,489,147.

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC ..................................... G06F 8/65; G06F 8/71
USPC ........................................................ 717/171
See application file for complete search history.

(56) References Cited

U.S. PATENT DOCUMENTS

| | | | | |
|---|---|---|---|---|
| 7,096,368 | B2 * | 8/2006 | Kouznetsov | H04L 69/329 713/193 |
| 7,735,078 | B1 * | 6/2010 | Vaidya | G06F 9/44547 717/171 |
| 8,321,857 | B1 * | 11/2012 | Prosso | G06F 8/61 717/172 |
| 9,164,754 | B1 * | 10/2015 | Pohlack | G06F 8/658 |
| 2008/0178149 | A1 * | 7/2008 | Peterson | G06F 8/443 717/110 |
| 2009/0144728 | A1 * | 6/2009 | Felts | G06F 8/60 717/175 |
| 2009/0328023 | A1 * | 12/2009 | Bestland | G06F 8/65 717/168 |
| 2011/0184870 | A1 * | 7/2011 | Angel | G06F 8/34 705/301 |
| 2011/0214116 | A1 * | 9/2011 | Vidal | G06F 8/65 717/173 |
| 2013/0081008 | A1 * | 3/2013 | Rangarajan | G06F 8/61 717/168 |
| 2013/0139091 | A1 * | 5/2013 | Raciborski | G06Q 30/02 715/772 |
| 2014/0032717 | A1 * | 1/2014 | Sharp | H04N 21/812 709/219 |
| 2018/0375946 | A1 * | 12/2018 | Brown | H04L 67/535 |

* cited by examiner

*Primary Examiner* — Jae U Jeon
*Assistant Examiner* — Bradford F Wheaton

(57) ABSTRACT

A method for patch management is described. The method includes downloading a patch that is incompatible with a patch management system. The method also includes creating an archive that is executable by the patch management system. The archive includes the incompatible patch. The method further includes sending the archive to the patch management system.

12 Claims, 9 Drawing Sheets

SYSTEM AND METHODS FOR PATCH MANAGEMENT

CROSS-REFERENCE TO RELATED APPLICATION

This application claims priority to and the benefit of U.S. application Ser. No. 14/504,169 filed Oct. 1, 2014 and is now U.S. Pat. No. 10,489,147, which is incorporated herein by reference in its entirety.

TECHNICAL FIELD

The present disclosure generally relates to computers and computer-related technology. More specifically, the present disclosure relates to systems and methods for applying software patches to computing devices employing a patch management system.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with networks is that it is difficult to apply a wide variety of software patches to computing devices under contemporary practices. Additionally, current methods of applying software patches may burden a network and may be time intensive. As can be observed from this discussion, systems and methods that make applying a variety of software patches more time efficient and less burdensome may be beneficial to the management of a computer network.

DETAILED DESCRIPTION

Figure 1:
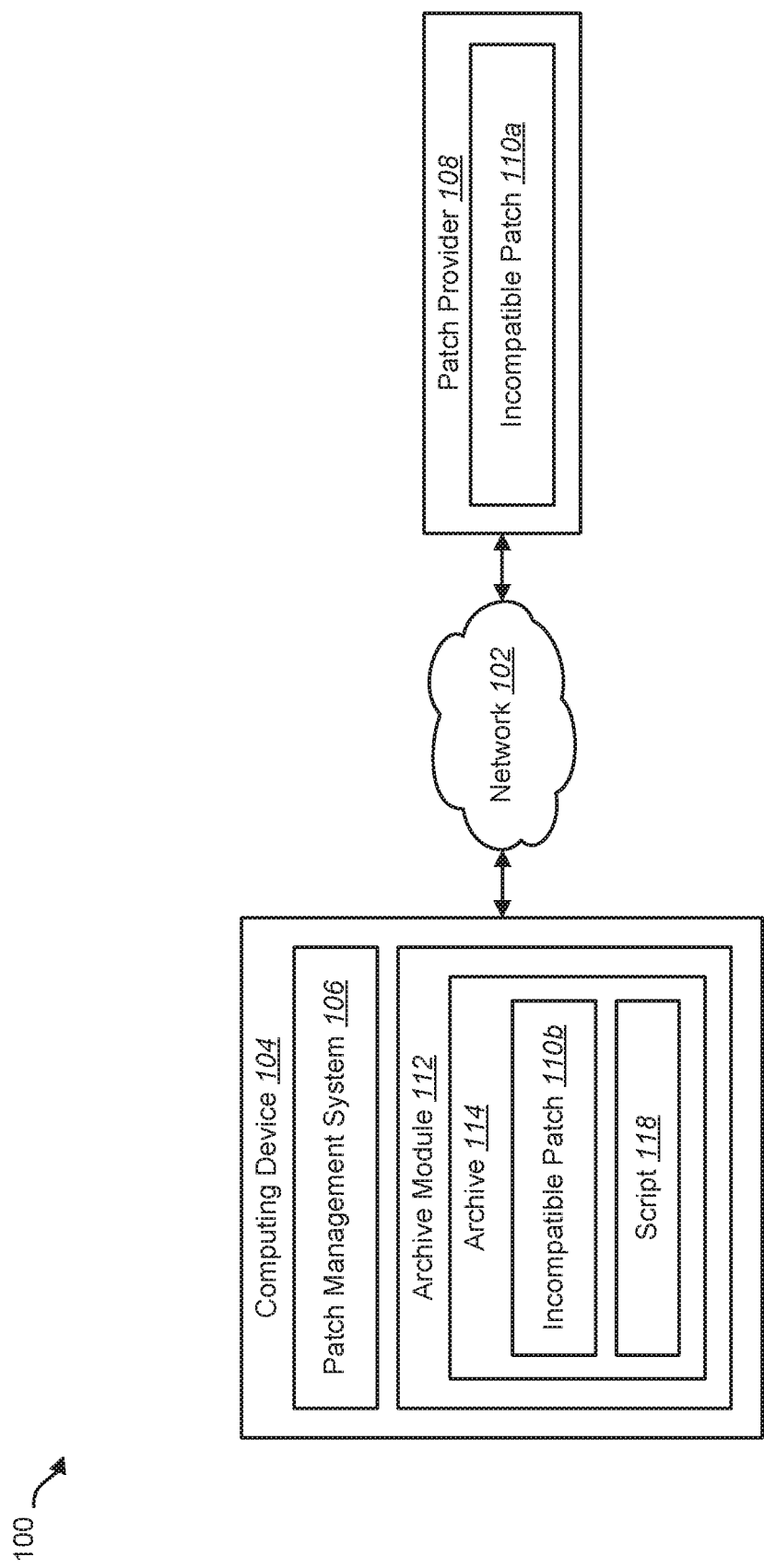
FIG. 1 is a block diagram illustrating one configuration of a system for patch management.

A method for patch management is described. The method includes downloading a patch that is incompatible with a patch management system. The method also includes creating an archive that is executable by the patch management system. The archive includes the incompatible patch. The method further includes sending the archive to the patch management system.

The archive further comprises a script containing pre-processing, installation and post-processing actions to install the downloaded patch. Supplemental content may be downloaded from a third-party. The supplemental content may be included in the archive. The supplemental content may include at least one utility program that is invoked by the script.

Creating the archive that is executable by the patch management system may include compiling content of the archive into a self-extracting archive. The self-extracting archive may be a file that is executable by the patch management system.

The method may also include providing a process exit code that satisfies the patch management system. Sending the archive to the patch management system may include calling application program interfaces in the patch management system to publish the archive into the patch management system.

The archive may be a non-self-extracting archive. The archive may include the incompatible patch, a script containing pre-processing actions installation actions and post-processing actions to install the downloaded patch, and command line instructions that are executable by the patch management system.

Downloading the patch that is incompatible with a patch management system may avoid re-hosting vendor data. The archive may be an executable file with a single entry point that satisfies the distribution and invocation requirements of the patch management system.

A computing device that is configured for patch management is also described. The computing device includes a processor, memory in electronic communication with the processor and instructions stored in the memory. The instructions are executable to download a patch that is incompatible with a patch management system. The instructions are also executable to create an archive that is executable by the patch management system. The archive includes the incompatible patch. The instructions are further executable to send the archive to the patch management system.

As indicated above, aspects of the present disclosure are directed to improvements related to the application of software patches to a computing device employing a patch management system. An electronic device may operate a patch management system. The patch management system may be used to install software patches to the computing device.

Patch management systems may employ data that is proprietary to their providers. For example, a patch management system may expect that a patch has a certain format. Therefore, support for patching products on a computing device often comes from the patch management system provider.

Many patch management systems are designed to only install patches that have a single entry point of execution to effect their installation, and may further be incapable of installing patches that do not have such installation mechanisms. Thus, many patch management systems may only be able to install patches that are compatible with that patch management system. In some cases, incompatible patches may be installed manually by a user or administrator. However, because of the difficulty and time involved with installing patches that are incompatible with a patch management system, these incompatible patches may not be installed on the computing device.

When a computing device is unable to install a patch that is incompatible with the installed patch management system, the computing device may not function appropriately. The inability or delay in installing the incompatible patch may also result in security vulnerabilities, loss of productivity, software malfunction, etc.

As demonstrated, there is a need for systems and methods for installing incompatible software patches using a patch management system on a computing device. The described systems and methods describe a patch management solution to deploy an incompatible patch using a patch management system. In one aspect, the described systems and methods describe the use of arbitrarily complex scripts that permit the deployment of any patch for a third-party product via a patch management system provided by another organization. The scripts may be encapsulated in an archive that is executable by the patch management system to facilitate incompatible patch installation. Further, the systems and methods disclosed herein may alleviate the potential security vulnerabilities, the loss of productivity, and software malfunctions that may arise when a computing device is unable to install a patch that is incompatible with the installed patch management system. Aspects of the present disclosure will be described in relation to a computing network that includes various components for managing computing devices belonging to an enterprise and components that cross multiple enterprises.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 for patch management. The system 100 may include one or more networks 102. The network 102 may include one or more Local Area Networks (LANs), Wide Area Networks (WANs), Wireless Local Area Networks (WLANs), the Internet, etc. One or more computing devices 104 may be connected to the network 102.

A computing device 104 may have an installed patch management system 106. The patch management system 106 may be a piece of computer software that installs patches. Examples of patch managements systems 106 include Microsoft System Center Configuration Managers (SCCM), Shavlik Protect®, and Symantec Client Management Suite by Altieris. A patch management system 106 may install a patch by invoking one or more commands included in the patch.

A patch may also be referred to as a software patch. Patches may update software running on the computing device 104. For instance, patches may be used to update the operating system, installed computer programs, installed hardware, firmware or other components of the computing device 104. A patch may also need to be installed for a variety of reasons. For example, a patch may correct a security flaw in a computer program installed on the computing device 104. A patch may also fix a flaw in a computer program's code. A patch may further increase the usability of the computing device 104.

A patch may be provided by a patch provider 108. A patch provider 108 may be an enterprise that produces software, hardware, and or computing devices 104, etc. In one scenario, the patch provider 108 may be the same enterprise (e.g., a first-party) that produces the patch management system 106. In another scenario, the patch provider 108 may be a different enterprise (e.g., a third-party) than the one that produces the patch management system 106. The patch provider 108 may be connected to the network 102 and be in electronic communication with the computing device 104.

The patch management system 106 may be configured to only install monolithic patches. As used herein, "monolithic" refers to a single, self-contained file that includes an installer with a single entry point of execution to effect the installation of software. With monolithic patches, no provision is made for behaviors outside of the monolithic installer itself. In other words, a patch that may be compatible with the patch management system 106 is a single-file patch with one entry point to launch its installation. The patch management system 106 may be incapable of installing patches that are not monolithic.

The patch management system 106 may include a patch definition import feature that that allows definitions supporting new products and patches to be regularly produced and disseminated to subscribers. For example, the producer of the patch management system 106 may publish definitions for its own products and patches. Furthermore, other enterprises (e.g., third parties) may produce patches that may be imported using the patch definition import feature of the patch management system 106.

The patch provider 108 may provide an incompatible patch 110a. An incompatible patch 110 may be a patch that is not monolithic. As described above, monolithic refers to a single, self-contained file that includes an installer with a single entry point of execution to effect the installation of software. A non-monolithic patch may have one or more entry points of execution to effect the installation of software. As an example, a non-monolithic patch may be patch that may utilize a dynamic link library (DLL), which may have one or more entry points of execution. Because the non-monolithic patch may have several entry points of execution, it may not be installed correctly in a patch management system 106 that is limited to installing monolithic patches with a single entry point of execution. Because the patch management system 106 may be limited to executing patches that are monolithic, this would leave a gap in the IT security management of the computing device 104.

Therefore, the incompatible patch 110 may need additional actions to be deployable by the patch management system 106.

In some cases, a patch 110 may be incompatible with an automated patch management system 106 if it requires human intervention. For instance, under certain circumstances, a patch 110 may require one or more of the following actions: a) a previous version of the application be halted and/or uninstalled, b) the system must be rebooted before, during, and/or after the installation, c) the user must respond to a prompt during the installation, d) files are extracted from an archive.

In order for the incompatible patch 110 to be installed via the patch management system 106, the incompatible patch 110 may be packaged so that it may be executed by the patch management system 106. The computing device 104 may include an archive module 112. The archive module 112 may be capable of performing operations that make the incompatible patch 110 compatible with the patch management system 106.

The archive module 112 may create an archive 114. The archive 114 may be an executable file with a single entry point that satisfies the distribution and invocation requirements of the patch management system 106. The archive 114 may include a downloaded incompatible patch 110*b*. The incompatible patch 110*b* may be downloaded from the patch provider 108.

The archive 114 may also include a script 118. The script 118 may include instructions for installing a patch that may have one or more entry points of execution. The script 118 may be arbitrarily complex depending on the number of entry points of execution and other characteristics of the incompatible patch 110*b*. For instance, a script 118 may be more complex for a non-monolithic patch that has many entry points of execution compared to a non-monolithic patch that has fewer entry points of execution. The script 118 may include pre-processing, installation and post-processing actions that may be performed to install the downloaded incompatible patch 110*b*.

Examples of actions a script 118 may perform may include one or more of the following: a) reading and writing registry keys; b) reading or creating files; c) determining actions to perform based on the current environment, including registry key existence, registry key values, file existence, file contents, running applications, or other system state; d) rebooting the system and performing actions before and after restart; e) uninstalling applications or patches; f) sending real time status to the patch management system 106 or monitoring applications; g) suspending applications such as anti-virus software; h) returning a status that is tailored to the patch management system 106.

In one configuration, the archive 114 may be created by compiling the content of the archive 114 into a self-extracting archive 114. The self-extracting archive 114 may be a file that is executable by the patch management system 106. Therefore, the self-extracting archive 114 may be an executable file with a single entry point that satisfies the distribution and invocation requirements of the patch management system 106. The archive 114 may enable the incompatible patch 110 to be installed by the patch management system 106 on the computing device 104. For example, the patch management system 106 may invoke the instructions included in the script 118 to install the incompatible patch 110*b*.

In another configuration, the archive 114 may be a non-self-extracting archive. The non-self-extracting archive 114 may be an archive 114 that is not be an executable file. In addition to the incompatible patch 110*b* and the script 118, a non-self-extracting archive 114 may also include command lines instructions that may be invoked by the patch management system. The invoked command line instructions may satisfy the distribution and invocation requirements of the requirements of the patch management system 106. The archive 114 may enable the incompatible patch 110 to be installed by the patch management system 106 on the computing device 104.

The systems and methods described may enable the system 100 to operate more securely and efficiently. Further, the systems and methods described may enable the computing device 104 to install patches that it would otherwise not install. By installing incompatible patches, the systems and methods described may enable the computing device 104 to operate with the latest patches, regardless of patch format.

Figure 2:
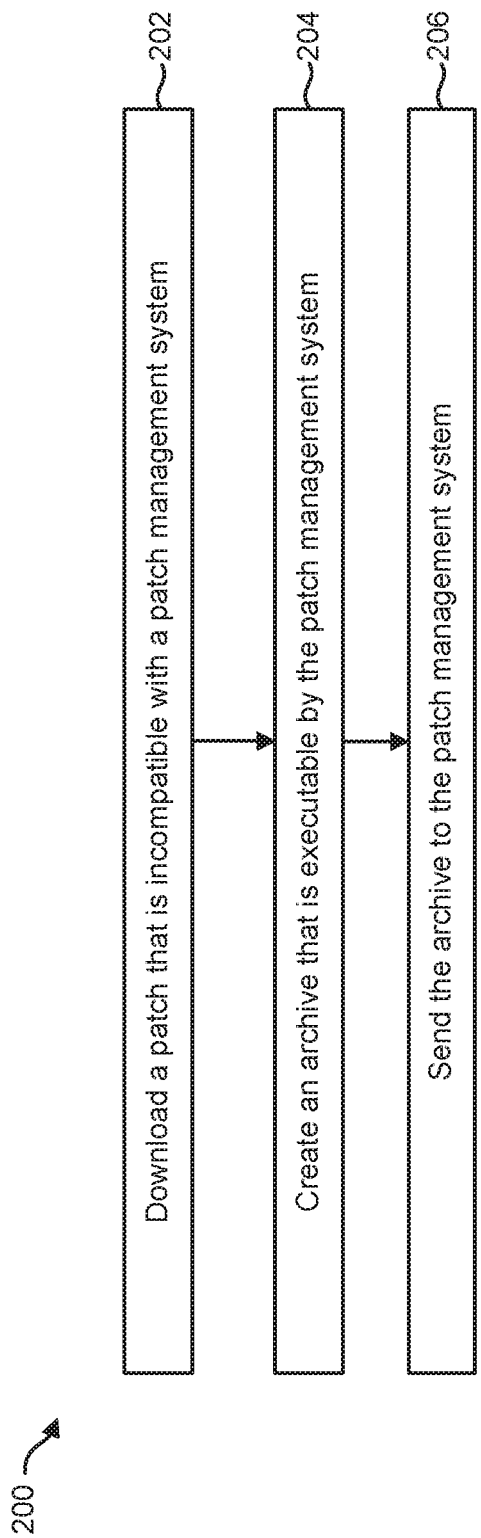
FIG. 2 is a flow diagram illustrating one configuration of a method for installing an incompatible patch using a patch management system running on a computing device.

FIG. 2 is a flow diagram illustrating one configuration of a method 200 for installing an incompatible patch 110 using a patch management system 106 running on a computing device 104. The method 200 may be implemented by the computing device 104 to facilitate the installation of an incompatible patch 110 on the computing device 104.

The computing device 104 may have a patch management system 106 installed. The patch management system 106 may install patches on the computing device 104. However, the patch management system may only be capable of installing patches that are monolithic patches, as described above. Thus, when a patch provider 108 creates an incompatible patch 110 (e.g., a non-monolithic patch) that is designed to update some aspect of a computing device 104, the computing device 104 may not be able to install the incompatible patch 110 via the patch management system 106 without further actions to make the incompatible patch 110 compatible.

The computing device 104 may download 202 the patch that is incompatible with the patch management system 106 running on the computing device 104. The incompatible patch 110 may be an update for the operating system of the computing device 104, an update for installed computer programs, an update for installed hardware, etc. The incompatible patch 110 may be downloaded from an enterprise that produces the installed patch management system 106, or may it may be downloaded from an enterprise that does not produce the installed patch management system 106. Downloading the incompatible patch 110 from an enterprise may avoid re-hosting vendor data.

The computing device 104 may create 204 an archive 114 that is executable by the patch management system 106, which may enable the patch management system 106 to install the incompatible patch 110. The archive 114 created by the computing device 104 may include the incompatible patch 110, and a script 118 that contains pre-processing, installation and post-processing actions that may install the incompatible patch 110. The pre-processing, installation and post-processing actions may include actions that may be needed to execute a non-monolithic patch in a patch management system 106 that is only capable of executing monolithic patches.

The installation action means an action that invokes the patch installer in a way that the patch management system 106 is not capable of performing, and occurs between pre- and post-processing actions. Examples of installation actions (besides non-monolithic): launching a patch installer with a standard stream redirected; launching the patch installer as a different user (than the patch management system 106 account); launching the patch installer at a non-default CPU priority, etc.

Once the computing device 104 has created the archive 114, the computing device 104 may send 206 the archive 114 to the patch management system 106. For example, the computing device 104 may send 206 the archive 114 to the patch management system 106 by calling application program interfaces (APIs) to publish the archive 114 in the patch management system 106. After the archive 114 is published in the patch management system 106, the patch management system 106 may execute the archive 114. Upon executing the archive 114, the patch management system 106 may then install the incompatible patch 110 using the script 118.

Figure 3:
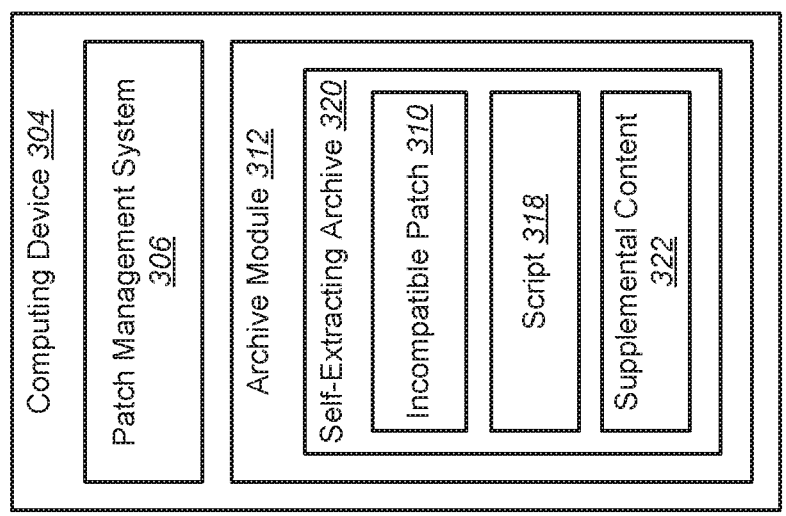
FIG. 3 is a block diagram illustrating one configuration of a computing device for installing incompatible patches via a patch management system on a computing device.

FIG. 3 is a block diagram illustrating one configuration of a computing device 304 that may be used in installing incompatible patches 310 via a patch management system 306. The computing device 304 may be similar to the computing device 104 described in connection with FIG. 1. The computing device 304 may include a patch management system 306 and an archive module 312. The patch management system 306 and archive module 312 may be similar to the patch management system 106 and archive module 112 described in FIG. 1.

In one configuration, the archive module 312 may be configured to create a self-extracting archive 320. The self-extracting archive 320 may be an executable file that automatically executes once it is published in the patch management system 306. The self-extracting archive 320 may be an executable file with a single entry point that satisfies the distribution and invocation requirements of the patch management system 306. The self-extracting archive 320 may include a downloaded incompatible patch 310 and a script 318. The incompatible patch 310 and the script 318 may be similar to the incompatible patch 110 and the script 118 described in connection with FIG. 1.

The script 318 in a self-extracting archive 320 may include commands for the self-extracting archive 320 to automatically execute once it is published in the patch management system 306. These commands may include a process exit code that satisfies the patch management system 306. The process exit code may be used by the patch management system 106 to determine if a patch was installed correctly, identify installation errors, and determiner if a system reboot is required.

The self-extracting archive 320 may also include supplemental content 322. Supplemental content 322 may include utility programs that may be installed along with the downloaded incompatible patch 310. Examples of supplemental content may include a) installers for other pre-requisite software components; b) utility applications that may, for example, detect and stop conflicting applications, or monitor and interact with the installer; c) arbitrarily complex scripts that would perform necessary operations such as alter registry keys, uninstall software, stop or suspend running services, suspend or stop and restart malware detection, download files, or execute other applications. The supplemental content may be downloaded from a patch management system provider, a patch provider, or a third-party that is distinct from either of those providers.

Figure 4:
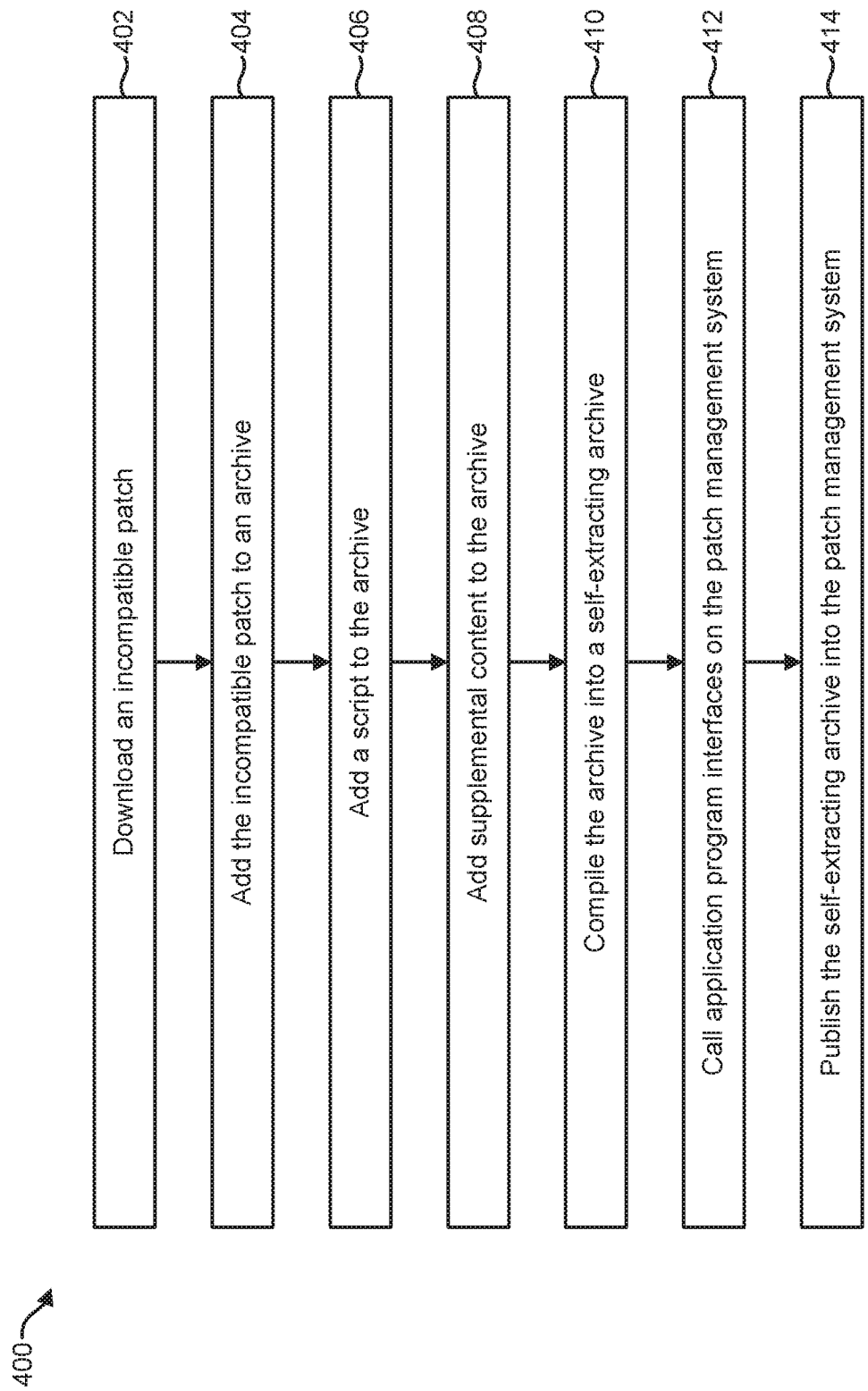
FIG. 4 is a flow diagram illustrating one configuration of a method for installing a downloaded incompatible patch on a patch management system using a self-extracting archive.

FIG. 4 is a flow diagram illustrating one configuration of a method 400 for installing an incompatible patch 310 on a patch management system 306 using a self-extracting archive 320. The method 400 may be implemented by a computing device 304 to facilitate the installation of the incompatible patch 310.

The computing device 304 may employ an archive module 312 to create a self-extracting archive to install the downloaded incompatible patch 310 using an installed patch management system 306 on the computing device 304.

To accomplish this, the computing device may download 402 an incompatible patch from a patch provider. The patch provider may be similar to the patch provider 108 described in connection with FIG. 1. The downloaded incompatible patch 310 may not be executable by the patch management system 306 running on the computing device 304. The downloaded incompatible patch 310 may be an update for the operating system of the computing device 304, an update for installed computer programs, an update for installed hardware, etc. The downloaded incompatible patch 310 may be provided by an enterprise that produces the installed patch management system 306, or may be provided by an enterprise that does not produce the installed patch management system 306.

In order to make the downloaded incompatible patch 310 executable with the patch management system 306, the computing device 304 may add 404 the downloaded incompatible patch 310 to an archive. The computing device 304 may also add 406 a script 318 to the archive. The script 318 may include the pre-processing, installation and post-processing actions necessary to install the downloaded incompatible patch 310. The computing device 304 may further add 408 supplemental content 322 to the archive.

The computing device 304 may compile 410 the archive into a self-extracting archive 320. The self-extracting archive 320 may be an automatically executing file that executes after it is published in the patch management system 306. In order to publish the self-extracting archive 320 in the patch management system 306, the computing device 304 may call 412 application program interfaces on the patch management system 306. Using the application program interfaces, the computing device 304 may publish 414 the self-extracting archive 320 on the patch management system 306. After the self-extracting archive 320 is published 414 into the patch management system 306, the patch management system 306 may automatically execute and install the downloaded incompatible patch 310 and supplemental content 322 on the computing device 304.

Figure 5:
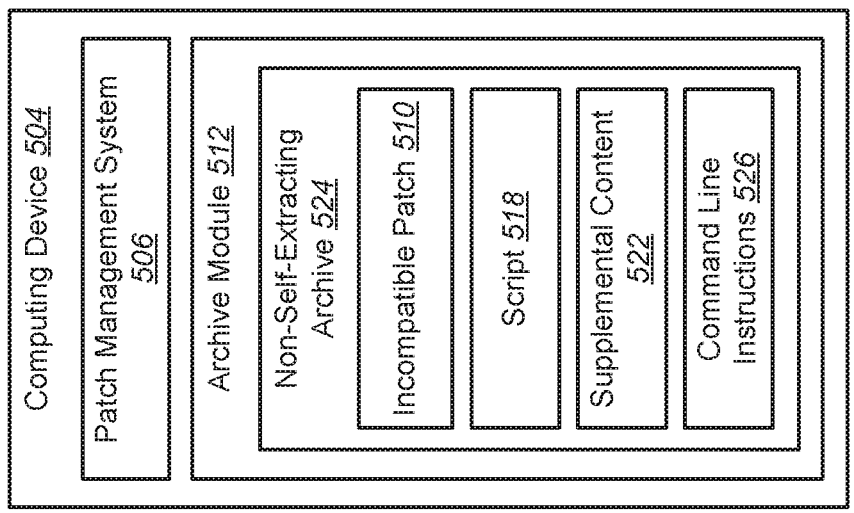
FIG. 5 is a block diagram illustrating another configuration of a computing device for installing incompatible patches via a patch management system on a computing device.

FIG. 5 is a block diagram illustrating another configuration of a computing device 504 for installing incompatible patches 510 via a patch management system 506 on a computing device 504. The computing device 504 may be similar to the computing device 104 described in connection with FIG. 1. The computing device 504 may include a patch management system 506 and an archive module 512. The patch management system 506 and archive module 512 may be similar to the patch management system 106 and archive module 112 described in FIG. 1.

In a second configuration, the archive module 512 may be configured to create a non-self-extracting archive 524. The non-self-extracting archive 524 may be a file that may be executed using command line instructions 526, after the non-self-extracting archive is published in the patch management system 506. The non-self-extracting archive 524 may include a downloaded incompatible patch 510 and a script 518. The downloaded incompatible patch 510 and the script 518 may be similar to the downloaded incompatible patch 110 and the script 118 described in connection with FIG. 1. The non-self-extracting archive 524 may also include supplemental content 522.

The non-self-extracting archive 524 may further include command line instructions 526 that may be used to execute the non-self-extracting archive 524 in the patch management system 506. Because the non-self-extracting archive 524 may not be a file that is executable by the patch management system 506, the command line instructions 526 may be invoked to install the archive 524 content. These command line instructions 526 may include a process exit code that satisfies the patch management system 506. The patch management system 506 may invoke the command line instructions 526 and effectuate the installation of the incompatible patch 510 and supplemental content 522.

Figure 6:
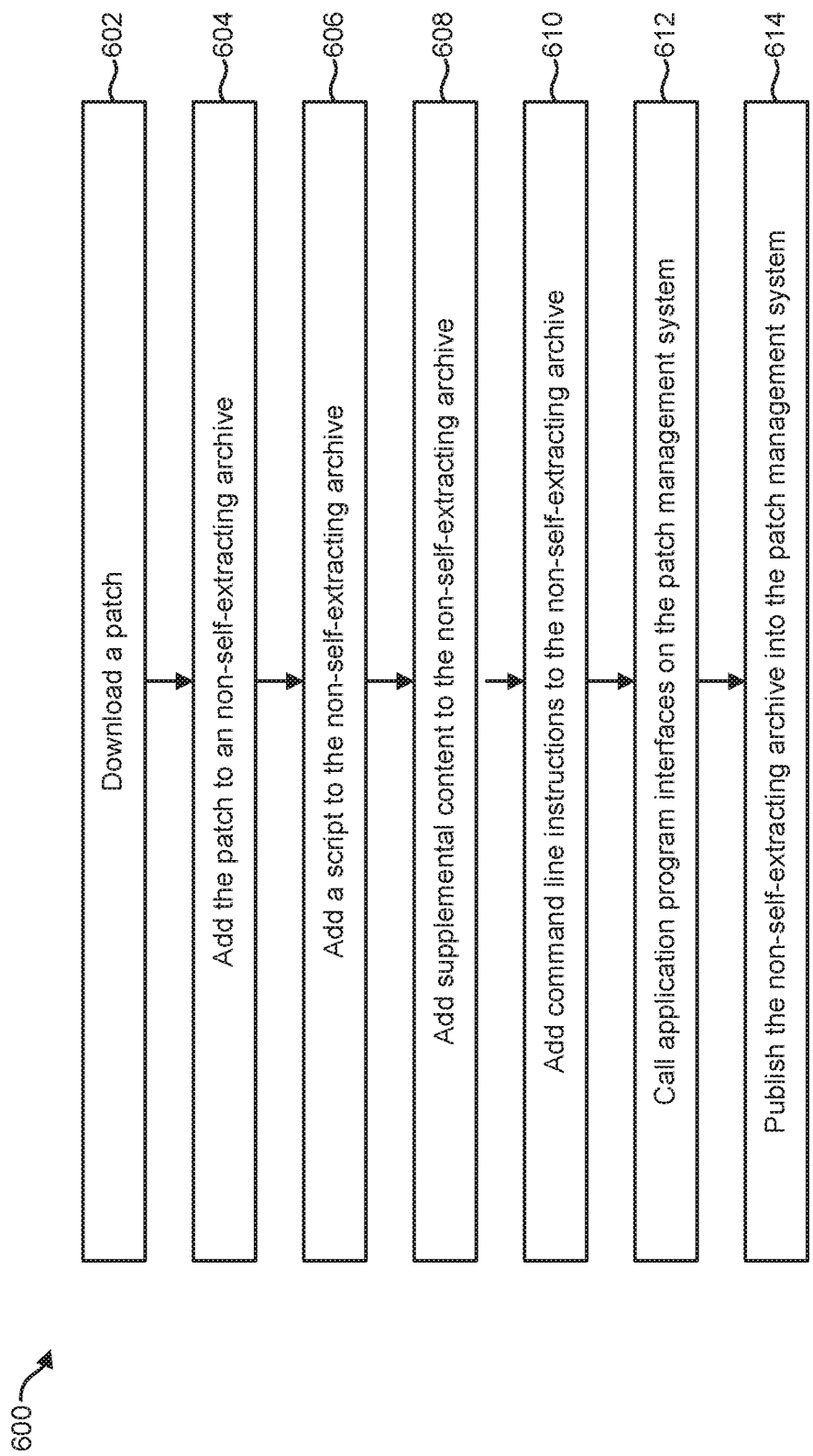
FIG. 6 is a flow diagram illustrating one configuration of a method for installing a downloaded incompatible patch on a patch management system using a non-self-extracting archive.

FIG. 6 is a flow diagram illustrating one configuration of a method 600 for installing an incompatible patch 510 by a patch management system 506 using a non-self-extracting archive 524. The method 600 may be implemented by a computing device 504 to facilitate the installation of incompatible patches 510.

The computing device 504 may employ an archive module 512 to install the downloaded incompatible patch 510 on the computing device 504 via an installed patch management system 506 on the computing device 504.

In one configuration, the computing device 504 may download 602 the patch that is incompatible with the patch management system 506 running on the computing device 504. The downloaded patch may be an update for the operating system of the computing device 504, an update for installed computer programs, an update for installed hardware, etc. The downloaded incompatible patch 510 may be provided by an enterprise that produces the installed patch management system 506, or may be provided by an enterprise that does not produce the installed patch management system 506.

In order to make the downloaded incompatible patch 510 compatible with the patch management system 506, the computing device 504 may add 604 the patch to a non-self-extracting archive 524. The computing device 504 may also add 606 a script 518 to the non-self-extracting archive 524. The script 518 may include the pre-processing, installation and post-processing actions necessary to install the downloaded incompatible patch 510. The computing device 504 may further add 608 supplemental content 522 to the non-self-extracting archive 524. The computing device 504 may also add 610 command line instructions to the non-self-extracting archive 524.

In order to publish the non-self-extracting archive 524 to the patch management system 506, the computing device 504 may call 612 application program interfaces (APIs) on the patch management system 506. Using the application program interfaces, the computing device 504 may publish 614 the non-self-extracting archive 524 to the patch management system 506. After the non-self-extracting archive 524 is published 614 into the patch management system 506, the patch management system 506 may execute the command line instructions 526 to install the downloaded patch 510 and supplemental content 522 on the computing device 504.

Figure 7:
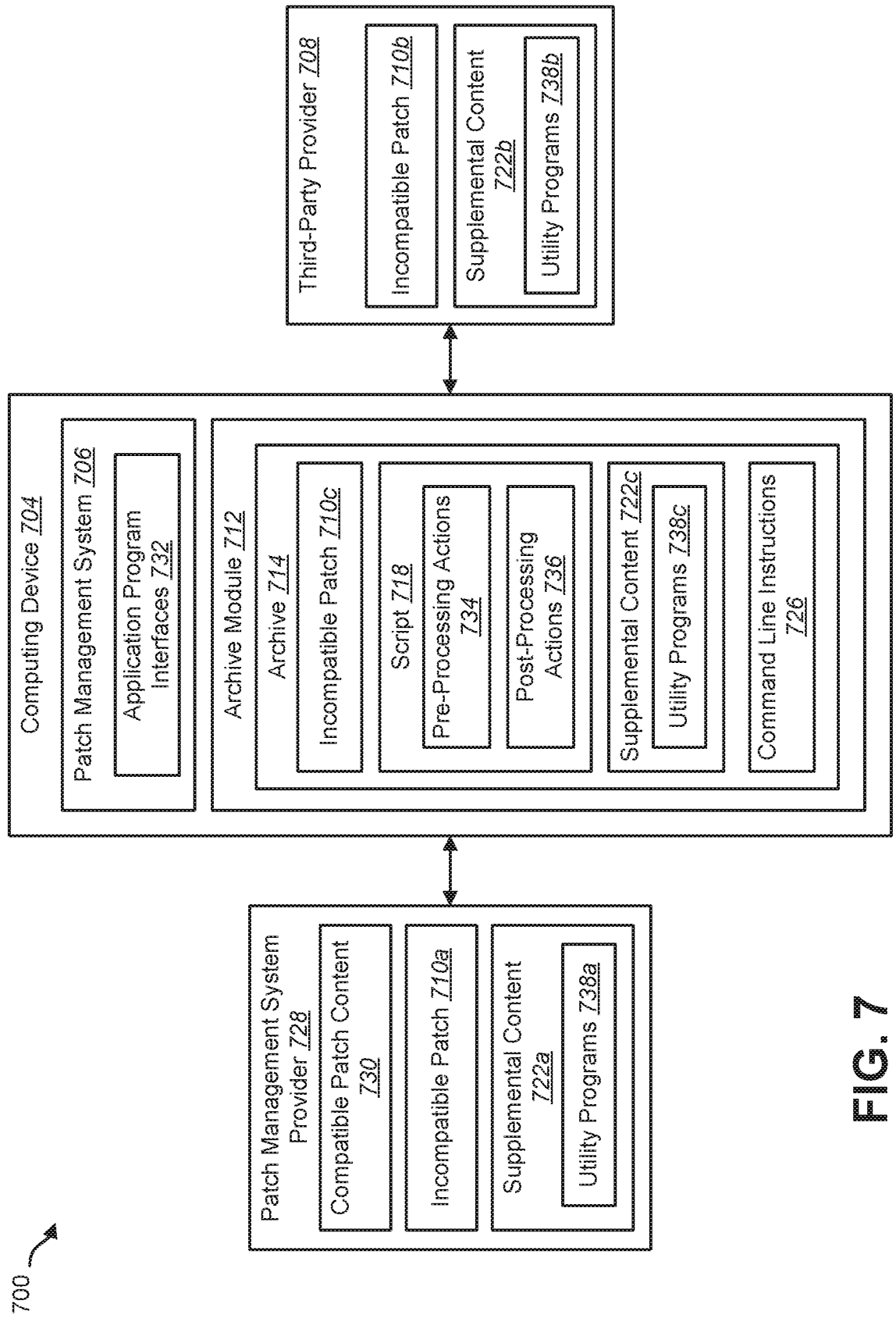
FIG. 7 is a block diagram illustrating a more complex configuration of a system for installing incompatible patches via a patch management system installed on a computing device.

FIG. 7 is a block diagram illustrating a more complex configuration of a system 700 for installing incompatible patches 710 via a patch management system 706 installed on a computing device 704. The system 700 may include a computing device 704. The computing device 704 may be similar to the computing device 104 described in connection with FIG. 1. The computing device 704 may be in electronic communication with one or more other computing devices, such as a patch management system provider 728 and a third-party provider 708.

The patch management system provider 728 and the third-party provider 708 may be computing devices operated by two different enterprises. The patch management system provider 728 and third-party provider 708 may be in electronic communication with the computing device 704 via a network.

The patch management system provider 728 may provide a patch management system 706 to the computing device 704. The patch management system provider 728 may also be referred to as a first-party. The patch management system 706 may be similar to the patch management system 106 described in connection with FIG. 1. The patch management system provider 728 may provide compatible patch content 730. The compatible patch content 730 provided by the patch management system provider 728 may be installed on the computing device 704 via the patch management system 706. In other words, the compatible patch content 730 may have a monolithic format that can be executed by the patch management system 706.

The patch management system 706 provided by the patch management system provider 728 may include application program interfaces 732. The application program interfaces 732 may be used in publishing an incompatible patch 710 into the patch management system 706 by an archive module 712.

The archive module 712 may enable a computing device 704 to install incompatible patches 710 via the patch management system 706. The patch management system provider 728 may provide an incompatible patch 710*a* to the computing device 704. A third-party provider 708 may also provide an incompatible patch 710*b* to the computing device 704. The incompatible patch 710*a* provided by the patch management system provider 728 may be a different patch than the incompatible patch 710*b* provided by the third-party provider 708. For instance, the incompatible patch 710*a* may update a different portion of the computing device 704 than the incompatible patch 710*b*. Further, the incompatible patch 710*a* may be a different file type or size than the incompatible patch 710*b*.

However, both the incompatible patch 710*a* provided by the patch management system provider 728 and the incompatible patch 710*b* provided by the third-party provider 708 may not be in a format that is executable by the patch management system 706. Therefore, the incompatible patch 710*a-b* may not be readily installed on the computing device 704 by the patch management system 706.

The patch management system provider 728 may provide supplemental content 722*a* to the computing device 704. A patch provider (e.g., the patch management system provider 728 or the third-party provider 708) may also provide supplemental content 722*b* to the computing device 704. Furthermore, another third-party, distinct from either the patch management system provider 728 or the third-party provider 708, may provide supplemental content 722. In one scenario, the incompatible patch 710 may be downloaded from one provider (e.g., Provider-A) while supplemental content 722 used to install that incompatible patch 710 is downloaded from another provider (e.g., Provider-B) before being published to the patch management system 706 that is provided by the patch management system provider 728 (e.g., Provider-C).

The supplemental content 722*a-b* may include utility programs 738*a-b* that may be installed with the incompatible patch 710*a-b*. However, the supplemental content 722*a-b* may not be in a format that is executable by the patch management system 706, and may not be readily installed along with the incompatible patch 710*a-b* to the computing device 704 by the patch management system 706.

In order to install the incompatible patch 710*a-b* and the supplemental content 722*a-b*, the archive module 712 may create an archive 714 that is executable by the patch management system 706. The archive 714 may be a self-extracting archive 320, as described in connection with FIGS. 3 and 4. Alternatively, the archive 714 may also be a non-self-extracting archive 524, as described in connection with FIGS. 5 and 6. The archive 714 may include the incompatible patch 710c. The incompatible patch 710c may be downloaded from either the patch management system provider 728, or the third-party provider 708. The archive may also include a script 718 that contains pre-processing actions 734, installation actions and post-processing actions 736 necessary to install the incompatible patch 710c via the patch management system 706.

The archive 714 may further include supplemental content 722c. The supplemental content 722c may be provided to the computing device 704 by the patch management system provider 728 and/or the third-party provider 708 of the patch 710 and/or another third-party provider 708, distinct from either of those providers. The supplemental content 722c may include utility programs 738c.

In the case of a non-self-extracting archive 524, the archive 714 may also include command line instructions 726. The command line instructions 726 may be included in the archive 714 if the archive 714 is a non-self-extracting archive 524, as described in connection with FIGS. 5 and 6. Because the non-self-extracting archive 524 is not a file that is executable by the patch management system 506, the command line instructions 726 may be invoked by the patch management system 506 to effectuate the installation of the content in the non-self-extracting archive 524.

Figure 8:
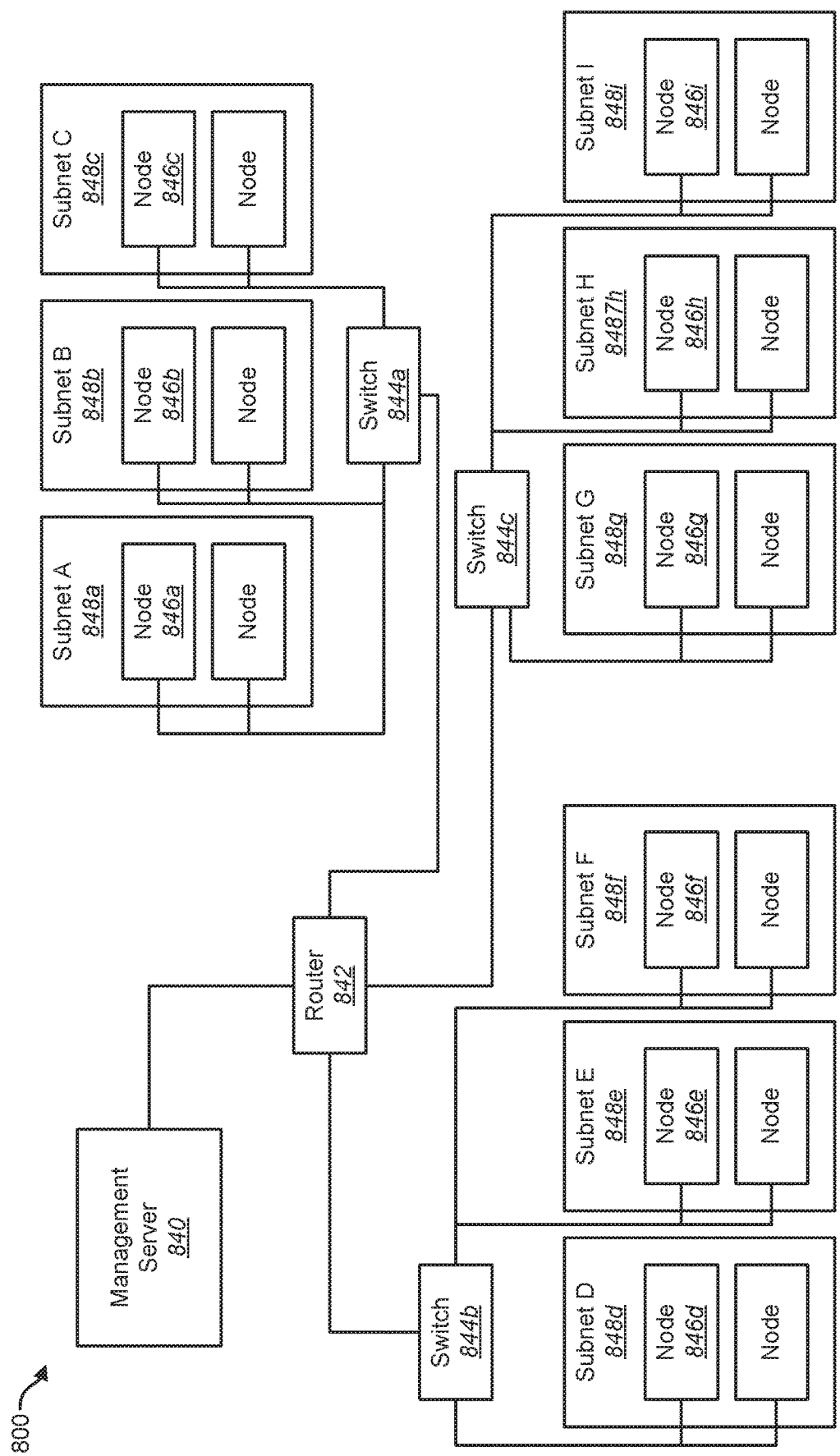
FIG. 8 is a block diagram that illustrates one configuration of a network where systems and methods patch management may be implemented.

FIG. 8 is a block diagram that illustrates one configuration of a network 800 where systems and methods patch management may be implemented.

A management server 840 is connected to a router 842. The router 842 is connected to switches 844a, 844b, and 844c. The switch 844a is connected to several nodes 846a, 846b, 846c, etc., via their respective subnets 848a, 848b, and 848c. The switch 844b is connected to several nodes 846d, 846e, 846f, etc., via their respective subnets 848d, 848e, and 848f. The switch 844c is connected to several nodes 846g, 846h, 846i, etc., via their respective subnets 848g, 848h, 848i. Although FIG. 8 only shows one router 842, and a limited number of switches 844, subnets 848 and nodes 846, many and varied numbers of routers 842, switches 844, subnets 848 and nodes 846 may be included in networks and/or systems that may implement systems and methods for patch management. It should be noted that one or more of the nodes 846a-i may be examples of one or more of the computing devices 104, 304, 504 and 704 described herein.

Figure 9:
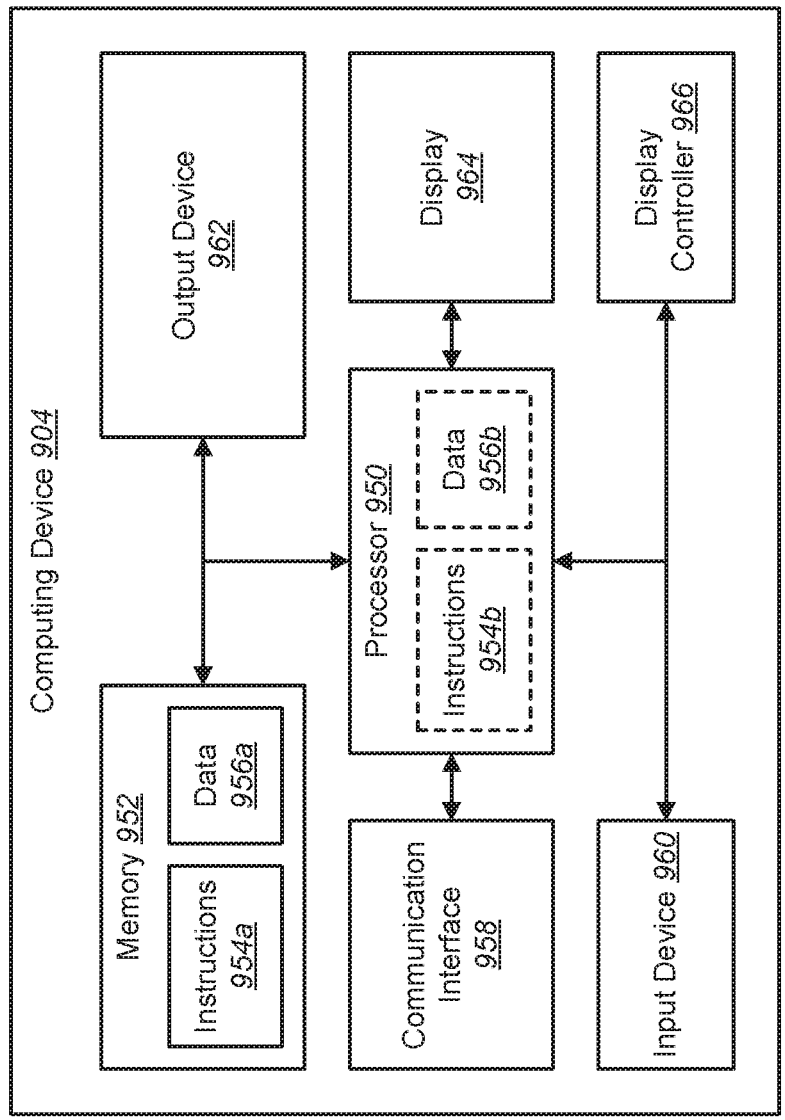
FIG. 9 illustrates various components that may be utilized in a computing device.

FIG. 9 illustrates various components that may be utilized in a computing device 904. The computing device 904 may be configured in accordance with one or more of the computing devices 104, 304, 504 and 704 described herein. The computing device 904 may include a processor 950 and memory 952. The memory 952 may include instructions 954a and data 956a. The processor 950 controls the operation of the computing device 904 and may be, for example, a microprocessor, a microcontroller, a digital signal processor (DSP) or other device known in the art. The processor 950 typically performs logical and arithmetic operations based on program instructions 954b and/or data 956b received from the memory 952.

The computing device 904 typically may include one or more communication interfaces 958 for communicating with other electronic devices. The communication interfaces 958 may be based on wired communication technology, wireless communication technology or both. Examples of different types of communication interfaces 958 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 904 typically may include one or more input devices 960 and one or more output devices 962. Examples of different kinds of input devices 960 include a keyboard, mouse, microphone, remote control device, button, joystick, trackball, touchpad, lightpen, etc. Examples of different kinds of output devices 962 include a speaker, printer, etc. One specific type of output device that may be included in a computer system is a display device 964. Display devices 964 used with configurations disclosed herein may utilize any suitable image projection technology, such as liquid crystal display (LCD), light-emitting diode (LED), gas plasma, electroluminescence, a cathode ray tube (CRT) or the like.

A display controller 966 may also be provided, for converting data stored in the memory 952 into text, graphics and/or moving images (as appropriate) shown on the display device 964. Of course, FIG. 9 illustrates only one possible configuration of a computing device 904. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method of patch management, the method comprising:
    downloading, at a compute device and from a first provider, a patch, wherein the patch is incompatible with an automated patch management system of the compute device because the downloaded patch is a non-monolithic patch having two or more entry points of execution to effect installation of the downloaded patch and the automated patch management system is limited to execution of patches having a single entry point of execution to effect the installation of the downloaded patch;
    downloading, at the compute device and from a second provider, supplemental processor executable content;
    producing, at the compute device, a non-self-extracting archive having a single entry point of execution that satisfies distribution and invocation requirements of the automated patch management system, the non-self-extracting archive including:
        the downloaded patch,
        at least a portion of the downloaded supplemental processor executable content, and
        a script including code executable on the compute device to perform command line instructions that are configured to be invoked by the automated patch management system to effectuate the installation of the non-self-extracting archive and actions performed to install the downloaded patch, wherein the actions include a pre-processing action, installation action, and post-processing action required to install the downloaded patch;
    compiling, at the compute device, the non-self-extracting archive;
    calling, by the compute device, an application program interface (API) on the automated patch management system; and
    using the API of the automated patch management system, publishing the compiled archive in the automated patch management system such that the command line instructions of the compiled archive are automatically executed to invoke the script to effectuate installation the downloaded patch and the supplemental processor executable content on the compute device.

2. The method of claim 1, wherein:
    the post-processing action includes an exit process that satisfies the automated patch management system, and
    the exit process includes one or more or a combination of:
        determining whether the downloaded patch is installed correctly;
        identifying an error associated with installing the downloaded patch; or
        determining whether a system reboot is required.

3. The method of claim 1, wherein the installation action includes launching a patch installer that occurs between the pre-processing action and the post-processing action.

4. The method of claim 1, wherein:
    the supplemental processor executable content is in a format that is incompatible with the automated patch management system;
    and
    the installation action includes an operation to enable installation of the supplemental processor executable content.

5. The method of claim 1, wherein the supplemental processor executable content comprises at least one utility program that is invoked by at least a portion of the script.

6. The method of claim 1, wherein:
    the downloaded patch includes one or more or a combination of:
        an update for an operating system of the compute device;
        an update for installed computer programs;
        an update for installed hardware; and
    the actions include one or more or a combination of:
        halting a previous version of an application;
        uninstalling a previous version of an application;
        rebooting the compute device before installation of the downloaded patch;
        rebooting the compute device during installation of the downloaded patch;
        rebooting the compute device after installation of the downloaded patch;
        responding by a user to a prompt during installation; and extracting one or more files.

7. One or more non-transitory media configured storing instructions that are configured in response to execution by one or more processors, cause a system to perform or control performance of operations comprising:
- downloading, at a compute device and from a first provider, a patch, wherein the patch is incompatible with an automated patch management system of the compute device because the downloaded patch is a non-monolithic patch having two or more entry points of execution to effect installation of the downloaded patch and the automated patch management system is limited to execution of patches having a single entry point of execution to effect the installation of the downloaded patch;
- downloading, at the compute device and from a second provider, supplemental processor executable content;
- producing, at the compute device, a non-self-extracting archive having a single entry point of execution that satisfies distribution and invocation requirements of the automated patch management system, the non-self-extracting archive including:
  - the downloaded patch,
  - at least a portion of the downloaded supplemental processor executable content, and
  - a script including code executable on the compute device to perform command line instructions that are configured to be invoked by the automated patch management system to effectuate the installation of the non-self-extracting archive and actions performed to install the downloaded patch, wherein the actions include a pre-processing action, installation action, and post-processing action required to install the downloaded patch;
- compiling, at the compute device, the non-self-extracting archive;
- calling, by the compute device, an application program interface (API) on the automated patch management system; and
- using the API of the automated patch management system, publishing the compiled archive in the automated patch management system such that the command line instructions of the compiled archive are automatically executed to invoke the script to effectuate installation the downloaded patch and the supplemental processor executable content on the compute device.

8. The one or more non-transitory media of claim 7, wherein:
- the post-processing action includes an exit process that satisfies the automated patch management system, and
- the exit process includes one or more or a combination of:
  - determining whether the downloaded patch is installed correctly;
  - identifying an error associated with installing the downloaded patch; or
  - determining whether a system reboot is required.

9. The one or more non-transitory media of claim 7, wherein the installation action includes launching a patch installer that occurs between the pre-processing action and the post-processing action.

10. The one or more non-transitory media of claim 7, wherein:
- the supplemental processor executable content is in a format that is incompatible with the automated patch management system; and
- the installation action includes an operation to enable installation of the supplemental processor executable content.

11. The one or more non-transitory media of claim 7, wherein the supplemental processor executable content comprises at least one utility program that is invoked by at least a portion of the script.

12. The one or more non-transitory media of claim 7, wherein:
- the downloaded patch includes one or more or a combination of:
  - an update for an operating system of the compute device;
  - an update for installed computer programs;
  - an update for installed hardware; and
- the actions include one or more or a combination of:
  - halting a previous version of an application;
  - uninstalling a previous version of an application;
  - rebooting the compute device before installation of the downloaded patch;
  - rebooting the compute device during installation of the downloaded patch;
  - rebooting the compute device after installation of the downloaded patch;
  - responding by a user to a prompt during installation; and
  - extracting one or more files.

* * * * *